United States Patent
Shi et al.

(10) Patent No.: US 10,944,254 B2
(45) Date of Patent: Mar. 9, 2021

(54) CLOSING CONTROL METHOD FOR HIGH-VOLTAGE DIRECT-CURRENT CIRCUIT BREAKER

(71) Applicants: NR Electric Co., Ltd, Jiangsu (CN); NR Engineering Co., Ltd, Jiangsu (CN)

(72) Inventors: Wei Shi, Jiangsu (CN); Bing Yang, Jiangsu (CN); Wei Lv, Jiangsu (CN); Wenjie Wang, Jiangsu (CN); Yeyuan Xie, Jiangsu (CN); Taixun Fang, Jiangsu (CN); Dongming Cao, Jiangsu (CN)

(73) Assignees: NR ELECTRIC CO., LTD, Jiangsu (CN); NR ENGINEERING CO., LTD, Jiangsu (CN)

( * ) Notice: Subject to any disclaimer, the term of this patent is extended or adjusted under 35 U.S.C. 154(b) by 197 days.

(21) Appl. No.: 16/318,699

(22) PCT Filed: Apr. 25, 2017

(86) PCT No.: PCT/CN2017/081873
§ 371 (c)(1),
(2) Date: Jan. 17, 2019

(87) PCT Pub. No.: WO2018/028247
PCT Pub. Date: Feb. 15, 2018

(65) Prior Publication Data
US 2019/0190258 A1    Jun. 20, 2019

(30) Foreign Application Priority Data
Aug. 9, 2016    (CN) .......................... 201610651095.2

(51) Int. Cl.
*H02H 7/26* (2006.01)
*H02H 1/00* (2006.01)
(Continued)

(52) U.S. Cl.
CPC .......... *H02H 7/268* (2013.01); *H02H 1/0007* (2013.01); *H02H 11/00* (2013.01);
(Continued)

(58) Field of Classification Search
CPC ...... H02H 1/0007; H02H 7/268; H02H 3/087; H02H 3/06; H02H 7/26; H02H 7/267; H01H 9/54; H01H 33/596
See application file for complete search history.

(56) References Cited

U.S. PATENT DOCUMENTS

| | | | |
|---|---|---|---|
| 3,534,226 A | 10/1970 | Lian | |
| 2014/0022680 A1* | 1/2014 | Berggren | H02H 7/268 361/79 |
| 2014/0346891 A1* | 11/2014 | Kang | H03K 17/725 307/113 |

FOREIGN PATENT DOCUMENTS

| CN | 203301358 U | 11/2013 |
|---|---|---|
| CN | 103618298 A | 3/2014 |
| CN | 106253243 A | 12/2016 |

OTHER PUBLICATIONS

WIPO, Chinese International Search Authority, International Search Report dated Jul. 26, 2017 in International Patent Application No. PCT/CN2017/081873, 4 pages.

* cited by examiner

*Primary Examiner* — Alex Torres-Rivera
(74) *Attorney, Agent, or Firm* — Masuvalley & Partners

(57) ABSTRACT

A closing control method for a high-voltage DC circuit breaker. The method comprises: closing breaking units of the transfer branch (2) group by group, then closing the main branch (1), and finally open the transfer branch. During the process of closing the breaking units of the transfer branch group by group, determine whether there is a fault in the power transmission system after closing current breaking (Continued)

unit group. if there is no fault, proceed to close the next breaking unit group until all breaking unit groups are closed before proceeding to the next step; if there is a fault, all the breaking units that have been closed are opened and the closing operation is ended. The method can pre-charge the power transmission system during the closing process of the high-voltage DC circuit breaker, and lower the overvoltage and system oscillation caused by the closing operation.

6 Claims, 4 Drawing Sheets

(51) Int. Cl.
*H02H 11/00* (2006.01)
*H01H 9/54* (2006.01)
*H02H 3/087* (2006.01)
*H02H 3/06* (2006.01)

(52) U.S. Cl.
CPC .................. *H01H 9/54* (2013.01); *H02H 3/06* (2013.01); *H02H 3/087* (2013.01)

CLOSING CONTROL METHOD FOR HIGH-VOLTAGE DIRECT-CURRENT CIRCUIT BREAKER

RELATED APPLICATIONS

This application is the U.S. National Phase of and claims priority to International Patent Application No. PCT/CN2017/081873, International Filing Date Apr. 25, 2017, entitled Closing Control Method For High-Voltage Direct-Current Circuit Breaker, which claims benefit of Chinese Patent Application No. 201610651095.2 filed Aug. 9, 2016; both of which are incorporated herein by reference in their entireties.

FIELD OF THE INVENTION

The invention relates to a closing control method for a high-voltage DC circuit breaker, belonging to the technical field of circuit breakers.

BACKGROUND OF THE INVENTION

Flexible DC transmission uses a voltage source converter, which may independently and quickly control active and reactive power, thereby improving system stability, suppressing system frequency and voltage fluctuations, and improving stability of the grid-connected AC system. With the depletion of fossil energy and the increasing environmental pressure, China and even the world are facing strategic adjustments in energy structure, and it is therefore imperative to develop and utilize new energy on a large scale.

With the development of flexible DC transmission to higher voltage and larger capacity, flexible DC transmission is applied to overhead line transmission to realize the objective requirements of optimal allocation of energy resources in China, and it is also the future trend of grid technology development. Due to the high probability of faults of the overhead line, lightning strikes and the like may cause overvoltage breakdown of the line tower, and a transient short circuit fault of the DC line occurs. Flexible DC transmission systems are equipped with high-voltage DC circuit breakers to quickly isolate faults. How to quickly recover system operation is an urgent problem in engineering applications. Overvoltage and system oscillation problems may occur when directly reclosing the high-voltage DC circuit breaker to charge an no-load DC line. Parallel connected resistors and bypass switches, which are series connected with the high-voltage DC circuit breaker, can be used to pre-charge the line to reduce the overvoltage caused by the closing operation, but additionally increases the site and cost.

SUMMARY OF THE INVENTION

The object of the present invention is to provide a closing control method for a high-voltage DC circuit breaker, which can effectively reduce the overvoltage and system oscillation caused by the closing operation and ensure the reliable and safe operation of the power transmission system by closing breaking units in a transfer branch group by group and smoothly charge the power transmission system through non-linear resistors of opened breaking units.

In order to achieve the above object, the technical solution adopted by the present invention is:

A closing control method for a high-voltage DC circuit breaker, the high-voltage DC circuit breaker comprising: a main branch and a transfer branch connected in parallel, the main branch comprising mechanical switches and main branch valve groups connected in series, the transfer branch includes one or more breaking units connected in series, the breaking unit includes a transfer branch valve group and non-linear resistors connected in parallel; the closing control method of the high-voltage DC circuit breaker comprises closing the transfer branch, then closing the main branch, and finally breaking the transfer branch.

The closing of the transfer branch is in such manner that the breaking units in the transfer branch are closed group by group, each group comprises at least one breaking unit.

In the process of closing the breaking units in the transfer branch group by group, the power transmission system is pre-charged by the non-linear resistor of the opened breaking unit.

Further, the number of breaking units in each group and the closing sequence are determined by an overvoltage level $U_{max}$ of the power transmission system and a maximum allowable closing time $T_{max}$; after any group of breaking units is closed, the impulse voltage is not higher than twice the overvoltage level $U_{max}$ of the power transmission system; the total time of closing all breaking units is not more than the maximum allowable closing time $T_{max}$ of the engineering requirement.

Further, in the process of closing the breaking units in the transfer branch group by group, determine whether there is a fault in the power transmission system after closing the current breaking unit group; if there is no fault, proceed to close the next breaking unit group until all breaking unit groups are closed before proceeding to the next step; if there is a fault, all the breaking units that have been closed are open and the closing operation is ended.

Further, the power transmission system faults include the line fault, the converter station fault, and the DC circuit breaker fault.

Further, the closing of the transfer branch is to deblock semiconductor components of the transfer branch valve group in the breaking unit, and the open of the transfer branch is to block the semiconductor components of the transfer branch valve group in the breaking unit.

Further, the closing of the main branch is to close the mechanical switches and the main branch valve groups.

Further, the number of the breaking units in one group and the closing sequence can be either preset or determined by online calculation.

Compared with the prior art, the beneficial effects achieved by the present invention are:

1) Pre-charging the power transmission system by using the nonlinear resistors in the transfer branch, which effectively saves cost and space. The current applications such as the flexible DC voltage source converter (VSC), the unified power flow controller (UPFC), and the static var generator (SVG) are all pre-charging the system by additionally adding the charging resistor and the bypass switch.

2) Make full use of the nonlinear resistor, and close the breaking units in the transfer branch group by group under the constraint of the system, thereby eliminating the impact of overvoltage and system oscillation caused by the closing operation, eliminating the negative impact on other important equipment of the system, greatly improve the stability and reliability of the entire system operation.

DETAILED DESCRIPTION OF THE EMBODIMENTS

The invention is further described below in conjunction with the drawings. The following embodiments are used only for a clearer description of the technical scheme of the present invention, but cannot be used to limit the scope of protection of the present invention.

Figure 2:
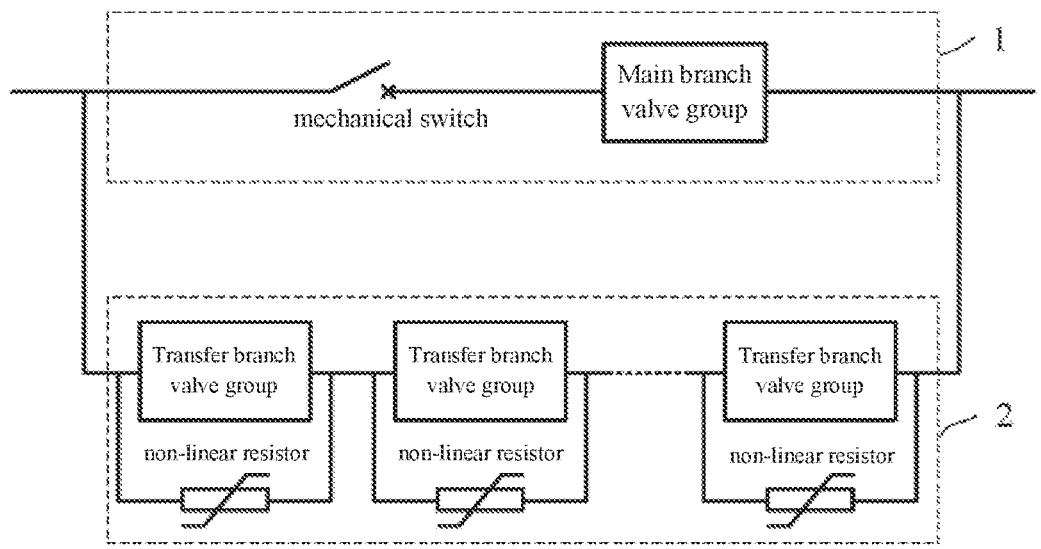
FIG. 2 shows a basic topology of the high-voltage DC circuit breaker.

FIG. 2 shows a basic topological structure of the high-voltage DC circuit breaker, including a main branch (1) and a transfer branch (2), and the main branch (1) and the transfer branch (2) are connected in parallel. The main branch includes the mechanical switch and the main branch valve group connected in series, and the mechanical switch may be one switch, or a plurality of switches connected in series. The transfer branch comprises one or more breaking units connected in series, the breaking unit comprises a transfer branch valve group and a non-linear resistor connected in parallel.

Figure 3:
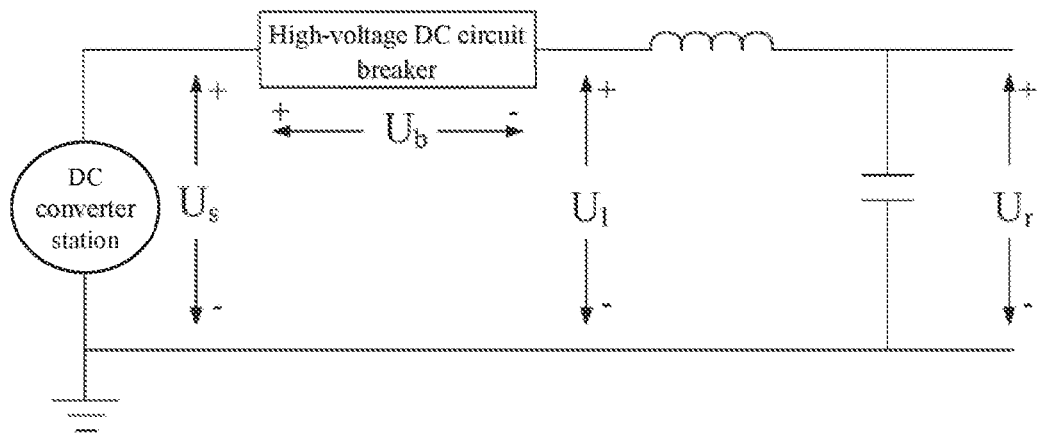
FIG. 3 is an equivalent circuit diagram of the high-voltage DC circuit breaker in a DC transmission system.

FIG. 3 shows an equivalent circuit diagram of the high-voltage DC circuit breaker in DC transmission system, wherein the output of the DC converter station is connected to the high-voltage DC circuit breaker, and the output of the high-voltage DC circuit breaker is connected to the power transmission line. The transmission line is equivalent to an inductor and a capacitor. $U_s$ represents the line-to-ground voltage at the converter station side for the high-voltage DC circuit breaker, $U_b$ represents the voltage across the high-voltage DC circuit breaker, $U_l$ represents the line-to-ground voltage at line side for the high-voltage DC circuit breaker, and $U_r$ represents far-end voltage of the line.

Figure 4:
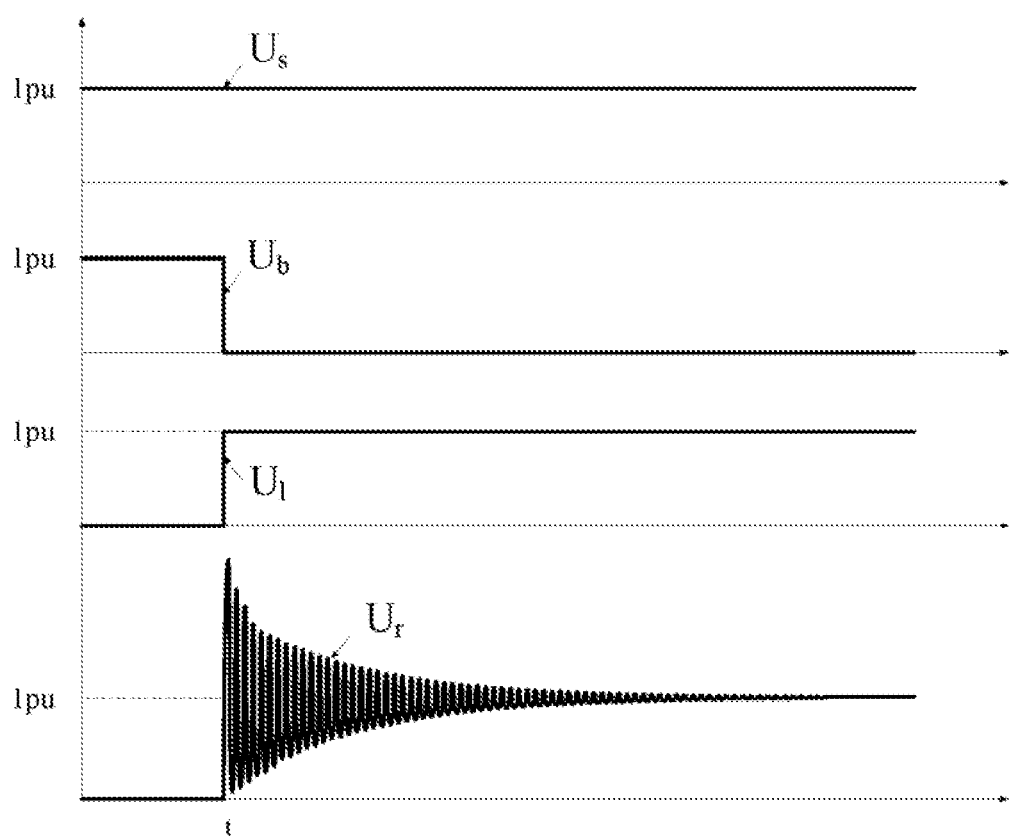
FIG. 4 is voltage waveforms under the existing closing control method of the high-voltage DC circuit breaker (pu is a per-unit value of DC line voltage in the figure).

The existing closing control method for the high-voltage DC circuit breaker includes: closing the transfer branch, then closing the main branch, and finally open the transfer branch. FIG. 4 is voltage waveforms under the existing closing control method of the high-voltage DC circuit breaker. At time t, the transfer branch is closed, that is, all the breaking units of the transfer branch are closed, the voltage $U_b$ across the high-voltage DC circuit breaker is instantaneously down to zero, the line-to-ground voltage $U_l$ at the line side of the high-voltage DC circuit breaker and the line-to-ground voltage $U_s$ at the converter station side are instantaneously equal. Such step change in voltage will cause the voltage $U_r$ at the far-end of the line to oscillate strongly. The higher overvoltage and oscillation have negative effects on the system operation, such as line arrester action and the converter station blocking.

In the closing control method for the high-voltage DC circuit breaker of the present invention, the breaking units of the transfer branch is first closed group by group, then the main branch is closed, and finally the transfer branch is open.

During the process of closing the breaking units of the transfer branch group by group, the power transmission system is charged by the non-linear resistor of the opened breaking unit. In practical engineering applications, the non-linear resistor can be a zinc oxide arrester.

The breaking units of the transfer branch is closed group by group, and the number of breaking units in each group and the closing sequence are determined by an overvoltage level $U_{max}$ of the power transmission system and a maximum allowable closing time $T_{max}$; after any group of breaking units is closed, the impulse voltage is not higher than twice the overvoltage level $U_{max}$ of the power transmission system; the total time of closing all breaking units is not more than the maximum allowable closing time $T_{max}$ of the engineering requirement.

In the process of closing the breaking units in the transfer branch group by group, whether there is a fault in the power transmission system is determined after the current breaking unit group is closed. The power transmission system faults include the line fault, the converter station fault and the DC circuit breaker fault. If no fault has occurred, proceed to close the next breaking unit group until all breaking unit groups are closed before proceeding to the next step. If there is a fault, all the breaking units that have been closed are open and the closing operation is ended.

Figure 5:
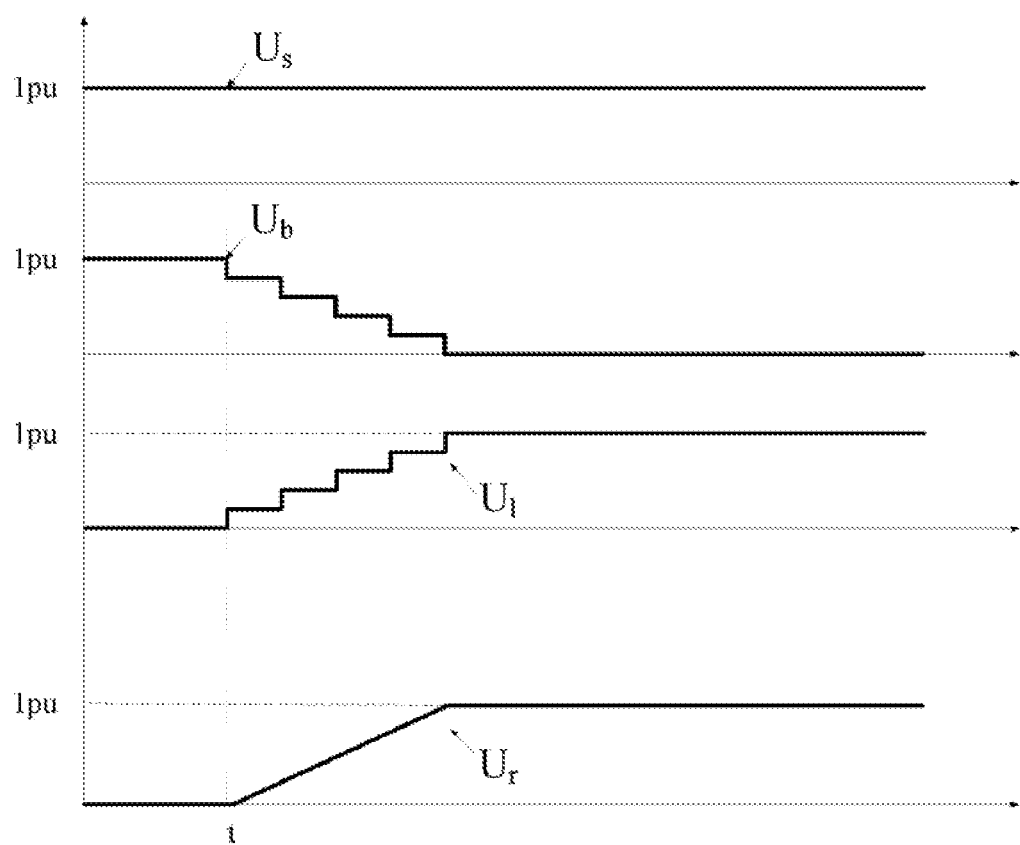
FIG. 5 is voltage waveforms under the closing control method of the high-voltage DC circuit breaker provided by the present invention (pu is a per-unit value of DC line voltage in the figure).

FIG. 5 is a diagram showing voltage waveforms under the closing control method of the high voltage DC circuit breaker of the present invention. Starting from the closing operation at time t, as the first group, the second group, the third group, the . . . group of breaking units are closed group by group, the voltage $U_b$ across the high voltage DC circuit breaker is slowly lowered, and the voltage $U_l$ at the line side of the high voltage DC circuit breaker rises slowly, so that the far-end voltage $U_r$ in the line arises slowly, effectively avoiding overvoltage and system oscillation caused by the closing operation.

Following is a high-voltage DC circuit breaker with ten breaking units in one transfer branch to further illustrate the specific implementation of the closing control method of the high-voltage DC circuit breaker of the present invention.

Grouping and sorting the breaking units in the transfer branch makes the impulse voltage and closing time meet the requirements. There are many performable combinations of grouping and sorting, such as:

1) Divided into two groups: the first group contains five breaking units, and the second group contains five breaking units; or the first group contains six breaking units, and the second group contains four breaking units; . . .

2) Divided into three groups: the first group contains five breaking units, the second group contains three breaking units, and the third group contains two breaking units; or the first group contains five breaking units, the second group contains two breaking units, and the third group contains three breaking units; . . .

3) Divided into four groups: the first group contains five breaking units, the second group contains three breaking units, the third group contains one breaking unit, and the fourth group contains one breaking unit; or the first group contains three breaking units, the second group contains one breaking unit, the third group contains one breaking unit, and the fourth group contains five breaking units; . . .

4) divided into five groups: the first group contains five breaking units, the second group contains two breaking units, the third group contains one breaking unit, the fourth group contains one breaking unit, and the fifth group contains one breaking unit; or the first group contains one breaking unit, the second group contains one breaking unit, the third group contains one breaking unit, the fourth group contains two breaking units, and the fifth group contains five breaking units; . . .

5) divided into six groups: . . .
6) divided into seven groups: . . .
7) divided into eight groups: . . .
8) divided into nine groups: . . .
9) divided into ten groups: . . .

Through system simulation or theoretical calculation, it can be concluded whether the scheme of grouping and sorting number meets the requirements of impulse voltage and closing time.

Figure 1:
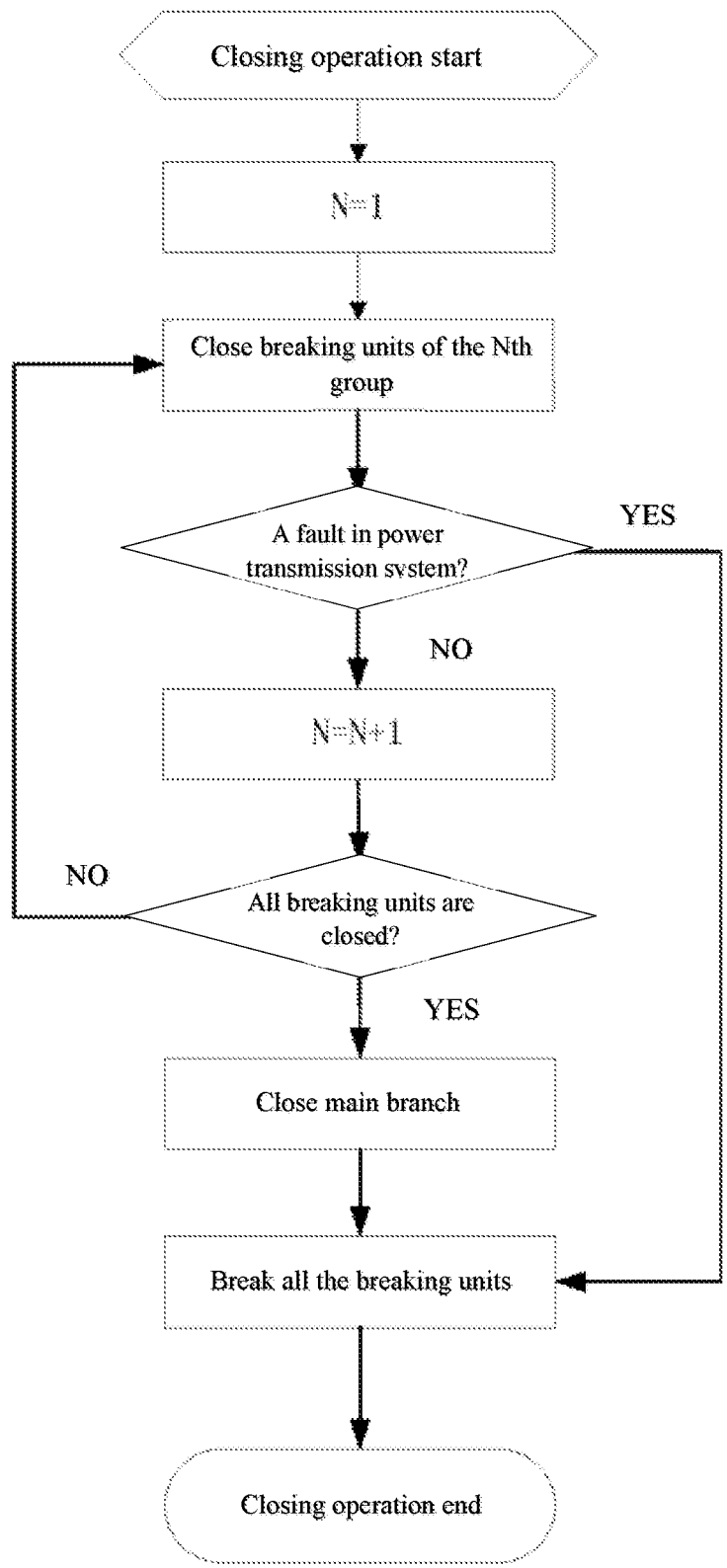
FIG. 1 is the flow chart of the closing control method for the high-voltage DC circuit breaker provided by the present invention.

FIG. 1 is a flow chart example of the closing control method for the high-voltage DC circuit breaker of the present invention, and the specific steps are as follows:

Step 1: After receiving the closing operation command, the initial value 1 is assigned to the group number N.

Step 2: Close breaking units of the Nth group (N=1, 2, 3 . . . ), that is, deblock the semiconductor components of the transfer branch valve group of the Nth breaking unit group. After the breaking units of the Nth group are closed, the non-linear resistors of the opened breaking units enter a low-resistance state to charge the power transmission system.

Step 3: Determine whether there is a fault in the line. After the breaking units of the Nth group are closed, time is left to determine whether there is a fault in the power transmission system, such as a line fault, a converter station fault, or a high-voltage DC breaker fault. If the fault occurs, proceed to step (7), the high-voltage DC circuit breaker fails to close; if there is no fault in the line, proceed to step (4) to perform the next step.

Step 4: N=N+1, ready to close the next group of breaking units.

Step 5: Determine whether the breaking units are all closed. If all are closed, proceed to step (6), otherwise proceed to step (2).

Step 6: Close the main branch. After the breaking units are all closed, the mechanical switches and the main branch valve groups of the main branch are closed.

Step 7: Open all breaking units of the transfer branch, and the high-voltage DC circuit breaker is closed successfully.

Step 8: The closing operation ends.

In the above-mentioned implementation steps, the method of grouping and numbering the breaking units of the transfer branch can also be improved to be performed without numbering.

The above is only a preferred embodiment of the present invention, and it should be pointed out that for the ordinary skilled person in the technical field, without departing from the technical principles of the present invention, a number of improvements and modifications can be made, which should also be considered as the scope of protection of the present invention.

The invention claimed is:

1. A closing control method for a high-voltage DC circuit breaker, the high-voltage DC circuit breaker comprising: a main branch and a transfer branch connected in parallel, the main branch comprises a mechanical switch and a main branch valve group connected in series, the transfer branch comprises at least one breaking unit, or comprises a plurality of breaking units connected in series, the breaking unit comprises a transfer branch valve group and a non-linear resistor connected in parallel; the closing control method of the high-voltage DC circuit breaker comprises closing the transfer branch, then closing the main branch, and finally breaking the transfer branch; characterized in that:
   closing of the transfer branch is in such manner that the breaking units in the transfer branch are closed group by group;
   in a process of closing the breaking units in the transfer branch group by group, a power transmission system is pre-charged by the non-linear resistor of the opened breaking units,
   when the transfer branch comprises the plurality of breaking units, in the process of closing the breaking units in the transfer branch group by group,
   a number of the breaking units and a closing sequence are determined by an overvoltage level $U_{max}$ of the power transmission system and a maximum allowable closing time $T_{max}$;
   after any one group of the breaking units is put into operation, an impulse voltage is not higher than twice the overvoltage level $U_{max}$ of the power transmission system;
   a total time of putting all the breaking units into operation is not more than a maximum allowable closing time $T_{max}$.

2. The closing control method for a high-voltage DC circuit breaker according to claim 1, characterized in that:
   in the process of closing the breaking units in the transfer branch group by group, determine whether there is a fault in the power transmission system after a group of the breaking unit is closed;
   if there is no fault, proceed to close a next breaking unit group until all breaking unit groups are closed, then proceed to a subsequent step;
   if there is a fault, all the breaking units that have been closed are opened and closing operation is ended.

3. The closing control method for a high-voltage DC circuit breaker according to claim 2, characterized in that:
   the fault in the power transmission system comprises a line fault, a converter station fault, and a DC circuit breaker fault.

4. The closing control method of the high-voltage DC circuit breaker according to claim 1, characterized in that:
   the closing of the transfer branch is to deblock semiconductor components of the transfer branch valve group in the breaking unit, and the breaking of the transfer branch is to block the semiconductor components of the transfer branch valve group in the breaking unit.

5. The closing control method for a high-voltage DC circuit breaker according to claim 1, characterized in that:
   the closing of the main branch is to close the mechanical switches and the main branch valve groups.

6. The closing control method of the high-voltage DC circuit breaker according to claim 1, characterized in that:
   a number of the breaking units in each group and a closing sequence are either preset or determined by online calculation.

* * * * *